Feb. 20, 1934.    L. D. KAY    1,947,911
DUAL TIRED TRUCK WHEEL
Filed July 11, 1932    2 Sheets-Sheet 1
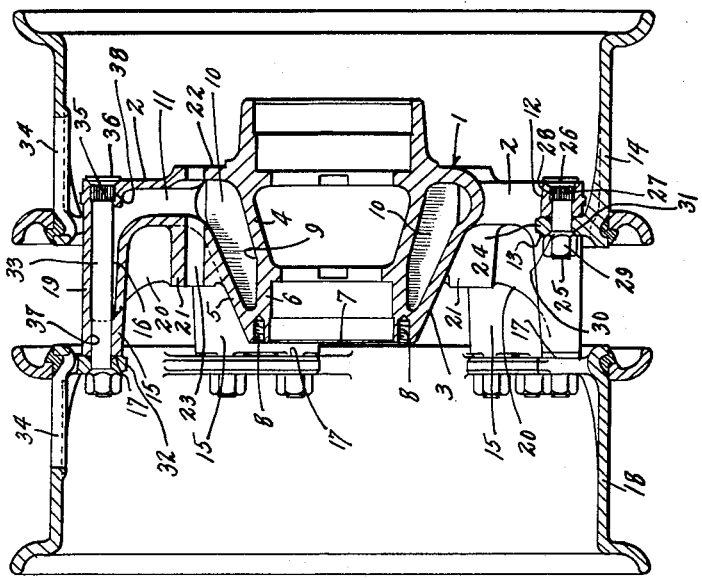
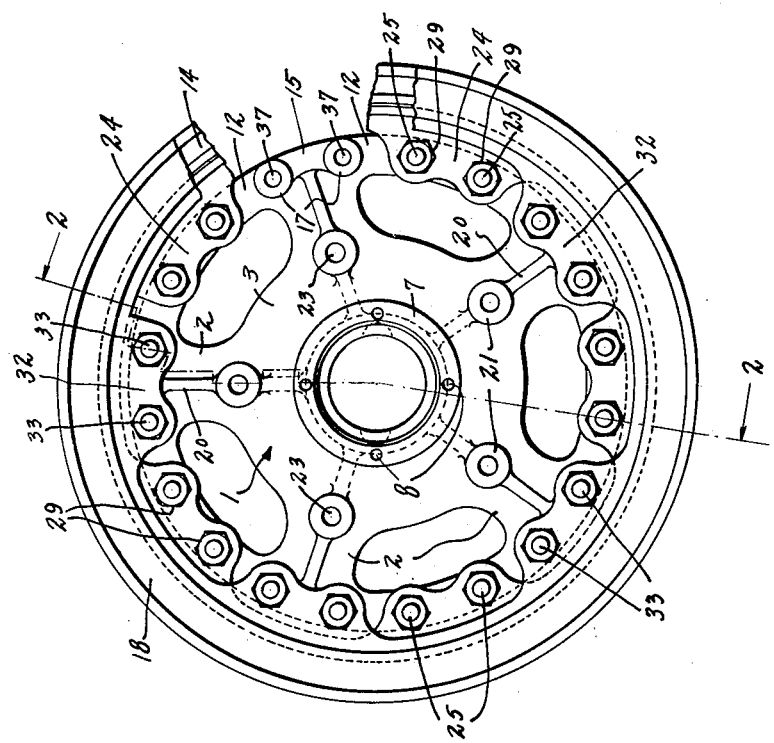
Inventor
Lloyd D. Kay
By Lyon & Lyon
Attorneys

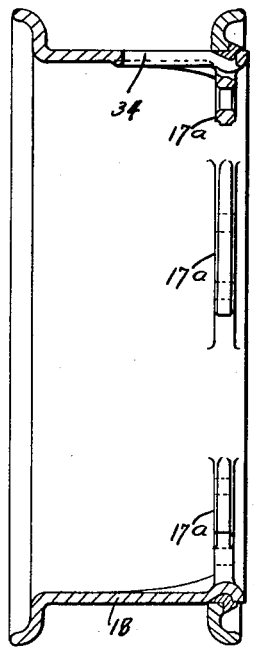
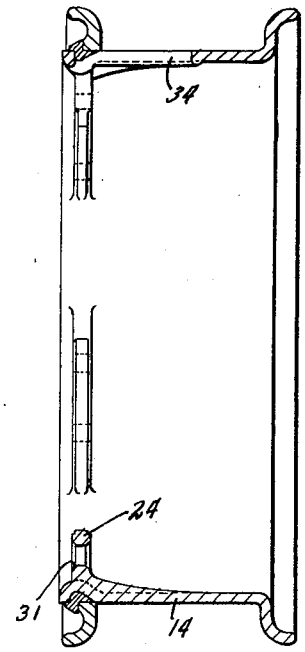
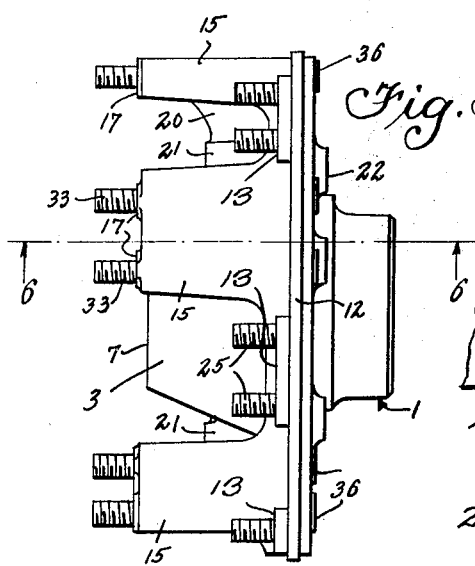
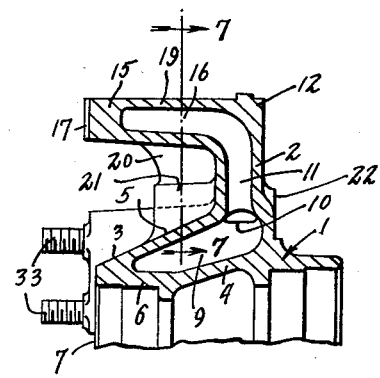
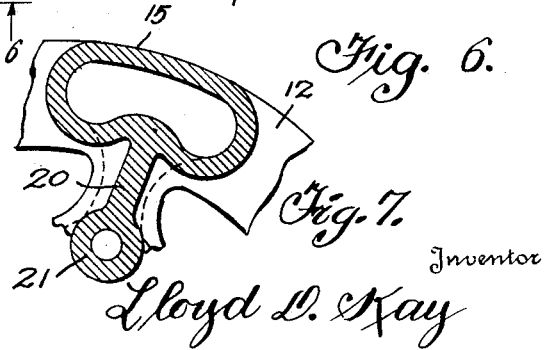

Patented Feb. 20, 1934

1,947,911

UNITED STATES PATENT OFFICE 1,947,911

DUAL-TIRED TRUCK WHEEL

Lloyd D. Kay, Los Angeles, Calif., assignor to Kay-Brunner Steel Products Inc., a corporation Application July 11, 1932. Serial No. 621,843

4 Claims. (Cl. 301—65)

This invention relates to dual-tired wheels and while the invention may be practiced in the manufacture of dual-tired wheels for any purpose, the invention is especially useful when applied in the construction of cast metal dual-tired truck wheels. Heretofore in the construction of wheels of this type it has been customary to provide a substantially conical inboard seat for the inboard tire rim and a substantially conical outboard seat for the outboard tire rim, and to provide means for securing the tire rims on these seats. The wheels have been generally provided with rims including hollow spokes, the ends of which are open and which permitted the entrance of mud into the cored space in the spokes. This is undesirable. One of the objects of this invention is to produce a dual-tired truck wheel having a body of special form especially adapting it for being produced of cast metal and avoiding the necessity for the use of a continuous conical seat for each of the tire rims, and having a construction in which the cored interior of the wheel body is entirely closed so that mud picked up by the wheel can not gain access to its interior.

A further object of the invention is to produce a wheel having a cast metal body having a form which especially adapts the wheel to resist the great road strains to which the wheel is subjected and particularly to provide effective means for supporting and taking the strains which are imparted to the wheel from the outboard tire rim.

Cast metal truck wheels heretofore have been usually made of cast iron or cast steel which, of course, is relatively heavy and considerably increases the weight of the truck. The momentum of a heavy truck wheel on a moving truck is very high and this adds to the momentum of the truck and increases the braking force necessary to bring a truck to a stop when this is necessary in driving a truck on a roadway. It is therefore desirable if possible to reduce the weight of such truck wheels.

One of the advantages of this invention is to produce a truck wheel having a form which particularly adapts it to be produced from duralumin or similar relatively light metal having sufficient resistance under compression to absorb the road forces to which the wheels are subjected in use.

Further objects of the invention will appear hereinafter.

The invention consists in the novel parts and combinations of parts to be described hereinafter, all of which contribute to produce an efficient dual-tired truck wheel.

A preferred embodiment of the invention is described in the following specification, while the broad scope of the invention is pointed out in the appended claims.

In the drawings:

Figure 1 is a side elevation of a truck wheel embodying my invention, portions of the tire rims being broken away so as to further illustrate details of the construction of the wheel body.

Figure 2 is a vertical section taken about on the line 2—2 of Figure 1.

Figure 3 is a vertical section through the outboard tire rim.

Figure 4 is a vertical section through the inboard tire rim.

Figure 5 is an edge elevation of the body of the wheel with the tire rims removed.

Figure 6 is a longitudinal section through the wheel taken about on the line 6—6 of Figure 5, and further illustrating details of the construction of the wheel.

Figure 7 is a vertical cross section on the line 7—7 of Figure 6, adjacent parts being broken away.

Referring more particularly to the parts, and especially to Figures 1 and 2, 1 indicates the body of the wheel which is preferably formed with a plurality of spokes 2, said spokes radiating from a hub 3.

This hub preferably comprises an inner substantially conical shell 4 and an outer substantially conical shell 5 which are integrally connected together with a short cylindrical section 6 of sufficiently small diameter to form an end face 7 for the hub which is provided with any suitable means such as threaded sockets 8 to receive a hub cap. Between the conical shells 4 and 5 a cored chamber 9 is formed and in this annular chamber a plurality of radial webs 10 are provided which unite the conical shells, and these webs greatly increase the strength of the wheel. The spokes 2 are formed with cored chambers 11 which communicate with the annular chamber 9 and constitute extensions thereof. The outer ends of the spokes are connected by integral rim sections 12, and the outboard faces of these rim sections constitute seats 13 for attachment of the inboard tire rim 14, as will be described hereinafter.

The outer end of each spoke 2 is formed into an integral post 15, and these posts project in an outboard direction on the wheel. Each post is provided with a cored chamber 16 (see Figure 6), which communicates with the radial cored chamber 11 in the spoke. The outboard end of each post constitutes a seat 17 for attachment of the outboard tire rim 18, as will be described hereinafter.

In this way it will be seen that the wheel body presents a plurality of equidistant circumferentially disposed seats 13 for attaching the inboard tire rim and it also presents a plurality of seats 17 intermediately disposed between the seats 13 for attaching the outboard tire rim.

In the embodiment of the invention illustrated the radial outer ends of the spokes are closed by peripheral walls 19 respectively, which are struck with a radius from the central axis of the wheel.

Between each post 15 and the hub 3 a substantially radial web 20 is provided, and in these webs I prefer to provide bosses 21 for attachment of bolts (not illustrated) to secure the brake drum to the brake drum seat 22 formed on the inboard end of the wheel body adjacent the hub. These bosses 21 may be provided with openings 23 to receive these bolts.

The inboard and outboard tire rims are constructed alike but are simply mounted in reverse positions as indicated in Figures 3 and 4. The inboard tire rim 14 adjacent to its inner end is provided with a plurality of inwardly projecting integral lugs 24, which lugs correspond in number and position to the seats 13 to which they must be secured. Similar lugs 17a are provided on the outboard rim for securing it, see Fig. 3.

In order to secure the lugs 24 on the seats 13, I prefer to employ two bolts 25 corresponding to each lug. These bolts are preferably driven or pressed into drilled openings formed in the rim sections 12 at the seats. Each bolt is preferably formed with an enlarged head 26 of substantially conical form adjacent to which a fluted neck 27 is formed on the bolt, said fluted neck being received in a counterbore 28 formed at the inboard end of the bolt hole (see Figure 2). The outer end of each bolt receives a nut 29 which is preferably formed with a conical inner face 30 that is received on a conical seat 31 formed in the outboard face of the lug.

The outboard tire rim 18 has its lugs 32 located adjacent its inboard end. These lugs are mounted on the ends of the post preferably by means of long bolts 33 that are similar in form to the bolts 25 and which are mounted in the casting in the same way.

Each tire rim is provided with a slot 34 to receive the inflating nipple of the tire if the tire to be mounted on the rim is a pneumatic tire.

The fluted necks 35 and the conical heads 36 of the long bolts 33, by reason of the fact that these parts are tight in the wheel, give the long bolts 33 a reinforcing effect to the post and are preferable to short bolts or studs which might be mounted in the outboard ends of the posts.

By reason of the fact that the peripheral walls 19 of the posts completely close the outer ends of the spokes, there is no opportunity for a wheel to pick up mud to accumulate within the cored chambers and add to the weight of the wheel.

It will also be evident that where tires of different widths are to be employed, the position of the outboard tire rim 18 can be changed to accommodate such different sizes of tires merely by making the posts 15 longer or shorter, as may be necessary.

It will also be evident that the webs 10 on the interior of the hub and the webs 20 on the exterior, being in line with each other, virtually give the effect of a continuous web having the profile of the two webs 10 and 20 (see Figure 2).

Where each bolt 33 passes through the outboard end of its corresponding post, an opening 37 is formed which is in alignment with the corresponding opening 38 through the inboard wall of the wheel at this point. If desired, these aligning openings 37 and 38 may be cored, using core prints, for supporting the core that forms the annular cored chamber 9 and the communicating cored chambers 11 and 16. The openings 23 for the brake drum bolts may also be cored if desired.

It is understood that the embodiment of the invention described herein is only one of the many embodiments this invention may take, and I do not wish to be limited in the practice of the invention, nor in the claims, to the particular embodiment set forth.

What I claim is:

1. In a cast metal dual-tired automobile wheel, the combination of a wheel-body having a hub with spokes and having a substantially conical inner shell and a substantially conical outer shell, with a cored chamber between said shells, said body having integral rim sections connecting the spokes adjacent the inboard end of the wheel, each of said rim sections having a seat in a plane substantially at right-angles to the axis of the wheel for securing the inboard tire rim, said spokes having cored chambers therein communicating with the first-named cored chamber, and the radially outer ends of said spokes having posts integral therewith and projecting in an outboard direction from the plane of the rim sections, each post having a seat on its outer end lying in a plane substantially at right angles to the axis of the wheel, for securing the outboard tire rim, a pair of fastening bolts on each of the ring section seats, and a pair of fastening bolts on each of the posts, said posts having cored chambers communicating with the cored chambers in the said spokes.

2. A dual-tired automobile wheel, having a body with a hub having an inner shell and an outer shell, and with a cored chamber between the shells, said hub having integral tubular spokes disposed radially from the same with cored chambers communicating with the first-named cored chamber, each spoke having a post projecting from the same in an outboard direction, and having a cored chamber therein communicating with the cored chamber of the spoke, said wheel having rim sections integrally uniting the inboard ends of the posts, said rim sections each having two bolts for securing the inboard tire rim thereto, the outboard end of each of said posts having two bolts projecting therefrom for carrying the outboard tire rim.

3. A dual-tired automobile wheel, having a body with a hub having an inner shell and an outer shell, and with a cored chamber between the shells, said hub having integral spokes disposed radially from the same with cored chambers communicating with the first-named cored chamber, each spoke having a post projecting from the same in an outboard direction, and having a cored chamber therein communicating with the cored chamber of the spoke, said wheel having rim sections integrally uniting the inboard ends of the posts and having bolts for securing the inboard tire rim thereto, the outboard end of each of said posts having two bolts projecting therefrom for carrying the outboard tire rim, a web corresponding to each spoke integrally uniting said conical shells, and a web on the outboard side of each spoke in radial alignment with the first-named web integrally uniting each post with the outer shell, said last-named webs having integral bosses formed therein for attachment of a brake drum to the wheel.

4. A dual-tired automobile wheel, having a body with a hub having an inner shell and an outer shell, and with a cored chamber between the shells, said hub having integral spokes disposed radially from the same with cored chambers communicating with the first-named cored chamber, each spoke having a post projecting from the same in an outboard direction, and having a cored chamber therein communicating with the cored chamber of the spoke, said wheel having rim sections integrally uniting the inboard ends of the posts and having bolts for securing the inboard tire rim thereto, the outboard end of each of said posts having two bolts projecting therefrom, forming a seat for carrying the outboard tire rim, each post having a cross section substantially conforming to the outline of the seat on its end and elongated transversely in a circumferential direction on the wheel.

LLOYD D. KAY.